Oct. 18, 1938.    M. DEMONTVIGNIER    2,133,850
ARRANGEMENT FOR CONTROLLING THE CONTROL
ELECTRODES OF IONIZED VAPOR VALVES
Original Filed Dec. 26, 1933
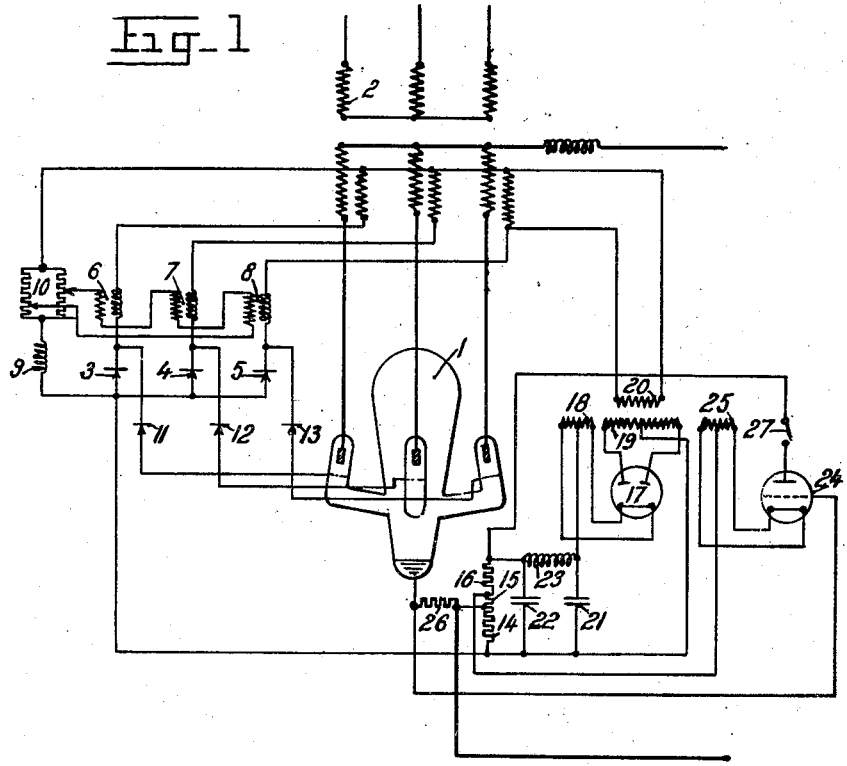
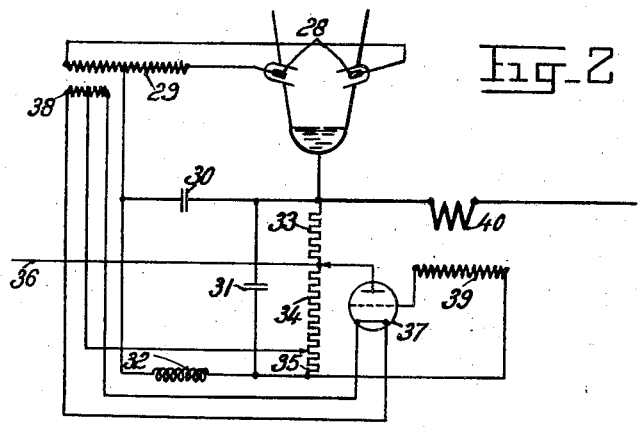
M. Demontvignier
INVENTOR
Marks & Clark
ATTYS.

Patented Oct. 18, 1938

2,133,850

UNITED STATES PATENT OFFICE 2,133,850

ARRANGEMENT FOR CONTROLLING THE CONTROL ELECTRODES OF IONIZED VAPOR VALVES

Marcel Demontvignier, Suresnes, France, assignor to Hewittic (Societe Anonyme) Suresnes, France, a corporation of France Application December 26, 1933, Serial No. 704,005
Renewed February 6, 1936. In France January 7, 1933

14 Claims. (Cl. 175—363)

In a prior patent application Serial No. 645,634 filed on December 3, 1932, several arrangements are described for supplying the feed voltages of the grids or control electrodes of ionized gas valves; these arrangements provide periodic voltages which give, for an instant determined by their period, a sudden variation between a negative value and a positive value, and allow, in consequence, the periodic striking of the arc to be put out of action with a constant phase, to the end of regulating, for example, the rectified voltage produced by the valve, utilized in the transformation of alternating current into direct current.

The present invention has for its object the combination of the preceding arrangements with a system which allows of the control at will of the automatic cutting off of the excess currents in the rectifier output circuit.

The method employed consists in suddenly superimposing on the grid control voltage a negative voltage which is sufficiently great to make the voltage between the grids and cathode become permanently negative; in these circumstances, it is known that the short circuit is opened in less than a period. The arrangements comprise, in addition, a particularity which allows the grids to be easily rid of the intense residual ionization which is brought about in consequence of the excess current.

In order to make the principle and the carrying out of the invention better understood, the following description of two embodiments is given, by way of example, with reference to the accompanying drawing, in which:

Figure 1 shows the application of the arrangements to the cutting off of excess currents delivered by a three phase rectifier, the control of the cutting off being obtained as a function of the current.

Figure 2 shows a modification of the cutting off arrangements modified with a view to the control by the derivation of the current with respect to time.

In Figure 1, a three phase rectifier 1, fed by a transformer 2, has its grids controlled by an auxiliary three phase rectifier, similar to that shown in Figure 10 of the prior patent application; this auxiliary rectifier comprises three rectifier elements 3, 4, 5 for example, of copper oxide, and saturation inductances 6, 7, 8 as well as the filter inductance 9 and the saturation control resistances 10. The grid resistances are constituted by the imperfect rectifier elements 11, 12 and 13, which offer a very small resistance in the permeable direction and a great resistance in the impermeable direction. The control voltage of the grids is the resultant of the voltage at the terminals of the elements 3, 4, 5 and a direct negative voltage, mentioned for grid polarization and produced at the terminals of the resistance 14. This voltage is provided by the valve 17, the cathode of which is heated by the winding 18 and the anodes are fed by the winding 19. The windings 18 and 19 are placed on an auxiliary transformer the primary 20 of which is fed by a suitable source, for example, an auxiliary winding of the transformer 2. The voltage given by the valve 17 is filtered by the two condensers 21 and 22 and the inductance 23. The filtered voltage is applied to the terminals of the unit comprising the resistances 14, 15 and 16, the value of these being chosen so that normally the voltage at the terminals of 14 is the normal polarization voltage, but by connecting a short circuit across 16, this voltage becomes sufficiently great to make all the grids permanently negative. Under these circumstances, the current will be cut off in less than a period in the rectifier 1; if it is desired to bring about this current stoppage at the time of an excess current, this excess current must bring about the short circuit of the resistance 16. With this end in view, a mechanical relay could be employed, but it is preferable, from the point of view of quickness and certainty, to use the arrangements shown in the figure, which effects this operation by means of an auxiliary ionized gas valve 24 provided with a grid; this valve, here represented as a valve having a thermionic cathode heated by the winding 25, has its anode and cathode connected to the two ends of the resistance 16. The grid-cathode voltage is given by superposition of the negative voltage on the terminals of the resistance 15 and of that at the terminals of the small resistance 26, placed in series in the output circuit of the rectifier. So long as the instantaneous voltage at the terminals of 26 remains lower than the voltage at the terminals of 15, that is to say, so long as the load on the rectifier remains below a certain limit, the grid of the valve 24 is negative and the arc cannot strike. If, on the contrary, the load rises above the fixed limit, the grid becomes positive and the arc strikes instantly, putting a short circuit across the resistance 16; the grids of the main rectifier are then made negative, and the residual ionization, after each rupture of the anode, is neutralized much more easily than the elements 11, 12 and 13, which used as the resistance of the grid, only offer a very small resistance to the passage of currents of positive ions, when they offer a very great resistance to the passage of currents of electrons, thus limiting the output of the grids in the direct direction. The result is that the current is stopped in the main rectifier, and that the current remains cut off since the valve 24 remains in operation. The arrangements described constitute an instantaneous static relay interlocked with the maximum carrying, the strength of the current at which cutting off takes place can be conveniently regulated by the restances 15 and 16.

The unlocking of the relay can be obtained by extinguishing the arc in the valve 24 by opening temporarily the contact 27. This operation could be equally effected by a static arrangement which would bring about the stopping of the current in the valve 24.

Instead of controlling the stopping as a function of the current, it can likewise be controlled as a function of a derivative of the current with respect to time; this is the basis of the arrangements shown in Figure 2.

In Figure 2, the polarization voltage is now provided by two auxiliary anodes 28 provided in the main rectifier itself; these two anodes in question are fed by the winding of the transformer 29 and the rectified voltage is filtered by the two condensers 30 and 31 and the inductance 32.

The filtered voltage is applied to the terminals of the unit comprising the three resistances 33, 34 and 35, connected in series. The normal polarization voltage is provided by the resistance 33, the lead 36 being connected to the common anode of the auxiliary grid control rectifier (elements 3, 4, and 5 in Figure 1).

The valve 37, the cathode of which is heated by the winding 38, is so arranged as to short-circuit the resistance 34, when its grid becomes positive with reference to the cathode; to this end, the voltage of the grid in question is obtained by the superposition of the negative voltage on the terminals of the resistance 35, and the voltage at the terminals of the secondary 39 of a current transformer, the primary winding 40 of which is placed in the output circuit of the rectifier. It is clear that with this arrangement the current will be cut off automatically in the rectifier, when its derivative, with respect to time, will have exceeded an instantaneous value controlled by the resistance 35.

The arrangements hereinbefore described are also applicable to the automatic cutting off of overloads in a reversed rectifier, which effects the transformation of continuous into alternating current or more generally in a valve used to any end whatsoever.

I claim:

1. An arrangement allowing the cutting off of overloads in an ionized gas valve with control electrodes, comprising a circuit supplied by an auxiliary source of direct current and comprising a resistance, an auxiliary circuit connected at the ends of a first portion of said resistance, an auxiliary valve with a control electrode in said auxiliary circuit, a connection between the output of the first valve and the control electrode of said auxiliary valve in such a manner that an overload through the first valve has for effect to ignite said auxiliary valve, to make it conductive and to increase the potential drop across a second portion of said resistance, and connections of the ends of said second portion to the circuit supplied by the first valve and to its said control electrodes so that said increase of potential drop renders said first valve non-conductive.

2. An arrangement allowing the cutting off of overloads in an ionized gas valve with control electrodes, comprising a circuit supplied by an auxiliary source of direct current and comprising a resistance, an auxiliary circuit connected at the ends of a first portion of said resistance, an auxiliary valve with a control electrode in said auxiliary circuit, a primary winding in the circuit supplied by the first valve and a secondary winding cooperating with said primary winding for supplying a tension to the control electrode of said auxiliary valve in such a manner that an over-increase of the derivative of the current through the first valve with respect to time has for effect to ignite said auxiliary valve, to make it conductive and to increase the potential drop across a second portion of said resistance, and connections of the ends of said second portion to the output of the first valve and to its said control electrodes so that said increase of potential drop renders said first valve non-conductive.

3. An arrangement allowing the cutting off of overloads in an ionized gas valve with control electrodes, comprising a circuit for supplying a negative tension to the control electrodes, a first resistance in said circuit connected at one of its ends to said control electrodes and at the other end to the cathode of said valve, a second resistance in the same circuit and in series with the said first resistance, and means for putting automatically in short circuit said second resistance in the case of an overload through the gas valve.

4. An arrangement allowing the cutting off of overloads in an ionized gas valve with control electrodes comprising a circuit for supplying a negative tension to the control electrodes, a first resistance in said circuit connected at one of its ends to said control electrodes and at the other end to the cathode of said valve, a second circuit including a second resistance and said first resistance and a source of uni-directional current, and means for short-circuiting said second resistance in case of an overload through the gas valve.

5. In an electric translating system, an electric valve of the vapor type comprising a control electrode, a circuit for exciting said control electrode comprising a source of current, and an imperfect rectifying element connecting said electrode with said circuit and forming the only path for the discharge of positive ion current from said electrode.

6. In an electric translating system, an electric valve of the vapor type having an anode with an associated control electrode and a cathode, a control electrode circuit for said valve including source means introducing positive and negative voltages therein, and an imperfect electric valve inserted in the only connection of said control electrode with said circuit to offer a relatively high resistance to the current flowing therethrough when said control electrode is at a positive potential with respect to said cathode, and a relatively low resistance to the current flowing therethrough when said control electrode is at a negative potential with respect to said cathode.

7. In an electric translating system, a discontinuously controllable electric valve having an anode with an associated control electrode and a cathode, a control electrode circuit for said valve including source means of control voltages operable to energize said control electrode at a potential which is positive with respect to said cathode to thereby release the flow of current through said valve, means operable to maintain said control electrode at a negative potential with respect to said cathode to cause interruption of the flow of current through said valve, and an imperfect electric valve forming the only connection between said control electrode and said circuit to limit the flow of current caused by said positive potential and to accelerate the application of said negative potential to said control electrode.

8. In an electric translating system, a discontinuously controllable electric valve having an anode with an associated control electrode and a cathode, a control electrode circuit for said valve including source means of control voltages operable to energize said control electrode at a potential which is positive with respect to said cathode to thereby release the flow of current through said valve, means responsive to an operating condition of said valve for modifying the voltages impressed on said circuit by said source means to maintain said control electrode at a negative potential with respect to said cathode to cause interruption of the flow of current through said valve, and an imperfect electric valve forming the only connection between said control electrode and said circuit whereby the flow of current caused by said positive potential is limited and the space about said control electrode is rapidly deionized upon application of said negative potential on the control electrode.

9. In an electric translating system, an electric valve of the vapor type having an anode with an associated control electrode and a cathode, a circuit for exciting said control electrode including a source of alternating voltage and a source of unidirectional voltage, means responsive to an operative condition of said valve for causing said sources to impress only negative potential on said control electrode to cause interruption of the flow of current through said valve, and an imperfect electric valve connecting said control electrode with said circuit to conduct and reduce the entire flow of current from said sources to said control electrode and to conduct the entire flow of inverse current from said control electrode to said sources without materially reducing such inverse current.

10. In an electric translating system, an electric valve of the vapor type having an anode with an associated control electrode and a cathode, a circuit for exciting said control electrode including a source of periodic potential having a steep wave front, and an imperfect auxiliary electric valve connected with said circuit and constituting a path for the entire flow of positive ion current from said electrode.

11. In an electric translating system, an electric valve of the vapor type comprising an anode with an associated control electrode and a cathode, a control circuit for said control electrode including a source of negative unidirectional voltage, a resistor in said circuit connected between said control electrode and said cathode, a second resistor serially connected with the first said resistor in said circuit, means responsive to variations of the flow of current through said valve for short circuiting the second said resistor to cause interruption of the flow of current through said valve, and an imperfect electric valve exclusively connecting said control electrode with said circuit to facilitate the neutralization of the residual ionization of the space about said control electrode upon operation of the first said means.

12. In a system for controlling the flow of electric current, an electron discharge device having an anode with a control electrode and a cathode, means comprising impedance means for impressing a potential on said control electrode of such sign and magnitude as to render said device non-conductive, means for periodically impressing another potential on said control electrode of such sign and magnitude as to overcome the first said potential to render said device conductive, an incomplete circuit connected across said impedance means, and means operable responsive to abnormal flow of current through said device for closing said circuit to render the second said potential ineffective.

13. In a system for controlling the flow of electric current, an electron discharge device having an anode with a control electrode and a cathode, means comprising impedance means for impressing a potential on said control electrode of such sign and magnitude as to render said device non-conductive, means for periodically impressing another potential on said control electrode of such sign and magnitude as to overcome the first said potential to render said device conductive, an auxiliary electron discharge device, means for connecting said auxiliary device across said impedance means, and means operable responsive to abnormal flow of current through the first said device for rendering said auxiliary device conductive to thereby render the second said potential ineffective.

14. In a system for controlling the flow of electric current, an electron discharge device having an anode with a control electrode and a cathode, means comprising impedance means for impressing a potential on said control electrode of such sign and magnitude as to render said device non-conductive, means for periodically impressing another potential on said control electrode of such sign and magnitude as to overcome the first said potential to render said device conductive, an auxiliary electron discharge device connected across said impedance means, means comprising a control electrode in said auxiliary device and a source of potential for maintaining said auxiliary device non-conductive, and means operable responsive to abnormal flow of current through the first said device for modifying the potential of the control electrode of said auxiliary device to render said auxiliary device conductive, whereby the second said potential is rendered ineffective.

MARCEL DEMONTVIGNIER.